United States Patent
Morizane

(12) 
(10) Patent No.: US 6,408,648 B1
(45) Date of Patent: Jun. 25, 2002

(54) METHOD FOR PRODUCTION OF METAL OXIDE GLASS MICROSPHERULES AT LOW TEMPERATURES

(76) Inventor: Toshinori Morizane, 26-k2, Hazawa 2-chome, Nerima-ku, Tokyo (JP)

(*) Notice: Subject to any disclaimer, the term of this patent is extended or adjusted under 35 U.S.C. 154(b) by 0 days.

(21) Appl. No.: 08/815,682

(22) Filed: Mar. 12, 1997

Related U.S. Application Data

(60) Continuation of application No. 08/377,230, filed on Jan. 24, 1995, now abandoned, which is a division of application No. 08/202,252, filed on Feb. 25, 1994, now abandoned.

(51) Int. Cl.$^7$ ............................................. C03B 37/016
(52) U.S. Cl. ........................................ 65/17.2; 65/21.1
(58) Field of Search ........................ 65/395, 17.2, 21.1

(56) References Cited

U.S. PATENT DOCUMENTS

| | | | | |
|---|---|---|---|---|
| 5,023,208 A | * | 6/1991 | Pope | ............................. 65/17 |
| 5,160,358 A | * | 11/1992 | Kondo | ........................ 65/901 |

OTHER PUBLICATIONS

Hlaváč, Jan, "The Technology of Glass & Ceramics" 1983, pp. 273–290, Elsevier Scientific Publishing Co.*

* cited by examiner

Primary Examiner—John Hoffmann
(74) Attorney, Agent, or Firm—Armstrong, Westerman & Hattori, LLP

(57) ABSTRACT

The invention provides a method for efficiently producing, in a low temperature region, a thin film or micro-spherules of a single component type or a multi-component type metal oxide glass, wherein an organic metal compound is subjected to hydrolyzation in a reaction liquid consisting of water and an organic solvent, with halogen ions ($F^-$, $Cl^-$) as a catalyst in the presence of boron ions (B'), followed by dehydration and condensation, after which a reaction product is vitrified at a temperature of 200° C. or below, thereby obtaining the single component type or multi-component type metal oxide glass film (reaction at a pH value between 5.0 and 4.5), or micro-spherules (reaction at a pH value between 8 an 10). Transparent and homogeneous glass film or micro-spherules, which are excellent in the heat-resistance, moisture-resistance, insulating property, gas-barrier property, and ion-migration preventive property, can be obtained in a normal temperature region.

3 Claims, No Drawings

METHOD FOR PRODUCTION OF METAL OXIDE GLASS MICROSPHERULES AT LOW TEMPERATURES

This application is a continuation of application Ser. No. 08/377,230 filed Jan. 24, 1995, now abandoned, which is a Divisional of application Ser. No. 08/202,252, filed Feb. 25, 1994, now abandoned.

BACKGROUND OF THE INVENTION a) Field of the Invention

This Invention relates to a method for production of metal oxide glass films and micro-spherules ranging from a single component type to a multi-component type, these metal oxide film and micro-spherules being destined for use as a coating material for prevention of oxidation in metals, pressurized cooking utensils, various kinds of paper and films, and so forth.

b) Description of the Technical Background

As the technique for forming a coating film on the surface of metals and others, there has so far been known the glass-lining method or the ceramic coating method. The former is a technique of using the enamel-coating method, in which alkali-silicate type glass is baked on the metal surface in two stages, while the latter is a technique of using flame-coating method, in which a high temperature molten body of metal oxides, borides, carbides, etc. is spattered in the form of their micro-spherules so as to cause them to dash against the base body at a high speed, thereby forming the flame-coated film.

After these methods, there was developed a technique, different from the above-mentioned melting method, in which use was made of a liquid phase. This technique includes, for example, a liquid-immersion method using hexafluorusilisic acid ($H_2SiF_6$), a sol-gel method, and so forth. There are two ways for this sol-gel method: the one is to prepare sol (colloidal substance) from salt of a metal, which is then vitrified; and the other is to hydrolyze an organic metal compound such as metal alkoxide, and then vitrify the hydrolyzed product. The latter method, as one example, is first to mix ethyl silicate $Si(OC_2H_5)_4$ with ethyl alcohol and water, followed by hydrolyzing the mixture to obtain transparent gel, after which alcohol and water are evaporated for contraction and solidification. The thus obtained solid body is heat-treated at high temperature to obtain silica glass.

However, the above-mentioned conventional techniques require, without exception, the high temperature heat-treatment. Even in the sol-gel method, by which an organic metal compound is hydrolyzed, the heat-treatment at 1,100° C. or higher is inevitable for the ultimate complete dehydration, a volumetric contraction, at that time, of the hydrolyzed product is not negligible. Also, in such high temperature heat-treatment process, there takes place generation of gas from the interior of the glass body, which tends to produce micropores therewithin, these becoming a cause for inviting deterioration in the quality of the coating film, etc. Further, in the conventional methods, there has not been known any example of producing multi-component type glass micro-spherules.

The present invention has been proposed in view of the above-described points of problem, and aims at providing a method for efficiently manufacturing transparent thin film and micro-spherules of a simple component type or an arbitrary multi-component type glass.

SUMMARY OF THE INVENTION

It is therefore an object of the present invention to provide a method for producing a single component or a multi-component metal oxide glass film, which comprises: subjecting a hydrolysis organic metal compound to hydrolyzation in a reaction liquid consisting of water and an organic solvent, with halogen ions as a catalyst in the presence of boron ions, while adjusting pH value of the reaction liquid in a range of from 4.5 to 5.0, followed by dehydration and condensation; thereafter, applying a reaction product onto the surface of a base material; and vitrifying the surface coat at a temperature of 200° C. or below.

It is another object of the present invention to provide a method for producing a single component type or a multi-component type metal oxide glass micro-spherule which comprises: subjecting a hydrolyzable organic metal compound to hydrolyzation in a reaction liquid consisting of water and an organic solvent, with halogen ions as a catalyst in the presence of boron ions, while adjusting pH value of the reaction liquid in a range of from 8 to 10, followed by dehydration and condensation: thereafter, rinsing a sedimented reaction product with water for separation; and vitrifying said rinsed and separated product at temperature of 200° C. or below.

The foregoing objects, other objects as well as particular method of production according to the present invention will become more apparent and understandable from the following detailed description thereof, when read in conjunction with preferred examples.

DETAILED DESCRIPTION OF PREFERRED EMBODIMENTS

There is no particular limitation to the organic metal compound to be used as the material for the practice of the method according to the present invention. Any hydrolyzable organic metal compounds may serve for the purpose. Preferred organic metal compound is metal alkoxide which is represented by a general formula $ME^2{}_n(OR^1)_{n-m}$ (where: M is a metal having oxidation number n; $R^1$ and $R^2$ represent the alkyl group; and m denotes an integer of 0 to (n−1)). $R^1$ and $R^2$ may be same or different. Preferred among these alkyl groups are the one where $R^1$ and $R^2$ contain four or less carbon atoms, i.e., methyl group $CH_3$ (hereinafter represented as Me), ethyl group $C_2H_5$ (hereinafter represented as Et), propyl group $C_3H_7$ (hereinafter represented as Pr), isopropyl group i-$C_3H_7$ (hereinafter represented as i-Pr), butyl group; $C_4H_3$ (hereinafter represented as Bu), isobutyl group i-$C_4H_3$ (hereinafter represented as i-Bu), and other lower alkyl groups.

For metal alkoxide, there may be exemplified: lithium ethoxide LiOEt, niobium ethoxide $Nb(OEt)_5$, magnesium isopropoxide $Mg(OPr-i)_2$, aluminum isopropoxide $Al(OPr-i)_3$, zinc propoxide $Zn(OPr)_2$, tetraethoxysilane $Si(OEt)_4$, titanium isopropoxide $Ti(OPr-i)_4$, barium ethoxide $Ba(OEt)_2$, barium isopropoxide $Ba(OPr-i)_2$, triethoxyboran $B(OEt)3$. zirconium propoxide $Zr(OPr)_4$, lanthanum propoxide $La(OPr)_3$, yttrium propoxide $Y(OPr)_3$, lead isopropoxide $Pb(OPr-i)_2$, and so forth. These metal alkoxides are readily obtainable in the general market. They are also available in the general market in the form of low condensation product obtainable by partial hydrolysis, which can be used as the starting material.

According to the method of the present invention, the above-mentioned hydrolyzable organic metal compounds may be used as they are, for the reaction. It is however more desirable to use these compounds in dilution with a solvent for easy control of the reaction. The solvent for dilution may be any one which is able to dissolve the above-mentioned organic metal compound, and to be uniformly mixed with water. Generally, aliphatic lower alcohols are preferably used. Examples are: methanol, ethanol, propanol, isopropanol, butanol, isobutanol, ethyleneglycol, propyleneglycol, and their mixtures. Also usable are mixed solvents such as butanol+cellosolve+butyl cellosolve, xylol+cellosolve acetate+methyl isobutyl ketone+ cylohexane, or others.

In case the metal contained in the above-mentioned organic metal compound is Ca, Mg, Al, and so forth, such metal reacts with water in the reaction liquid to produce a hydroxide, or, if carbonic acid ions $CO_3^{2-}$ are present, carbonate is produced to bring about sedimentation. To avoid such phenomena, it is desirable to add alcohol solution of triethanolamine as a masking agent.

Concentration of the organic metal compound, when it is mixed with a solvent for dissolution, should desirably be 70% (by weight) or below in an ordinary case, or more particularly in a range of from 5 to 70% (by weight).

The reaction solution to be used for practicing the method of the present invention consists generally of water and organic solvent. As the organic solvent for use in the reaction solution, any kind of organic solvents may serve for the purpose, provided that they can yield uniform solution with water, acid, and alkali, of which aliphatic lower alcohols to be usually used for dilution of the above-mentioned organic compound are preferable. Of these lower alcohols, preferred are propanol, isopropanol, butanol, and isobutanol, all having higher carbon content than methanol and ethanol. The reason for this is that such lower alcohols contribute to stable growth of the metal oxide glass film and micro-spherules to be produced.

A mixing ratio of water and the organic solvent constituting the reaction solution may be in a range of from 0.2 to 50 mol/liter in terms of the concentration of water.

The method according to the present invention is characterized in that an organic metal compound is subjected to hydrolysis in the above-mentioned reaction solution with halogen ions as a catalyst in the presence of boron ions. As the compound releasing the boron ion $B^{3+}$, use is made of trialkoxyboran $B(OR)_3$, of which triethoxyboran $B(OEt)_3$ is preferable. Concentration of $B^{3+}$ in the reaction solution should preferably be in a range of from 1.0 to 10.0 mol/liter.

The halogen ion to be used is $F^-$, $Cl^-$, or a mixture of these ions. The compound releasing the halogen ion may be anyone which can produce $F^-$ ion and $Cl^-$ ion in the above-mentioned reaction solution. Preferred examples are: acid ammonium fluoride $NH_4F \cdot HF$, sodium fluoride NaF, and so forth, as the $F^-$ ion source: and ammonium chloride $NH_4Cl$, and others, as the $Cl^-$ ion source.

Concentration of the above-mentioned halogen ion in the reaction liquid differs on various conditions such as film thickness of the metal oxide glass to be produced, or diameter of such metal oxide micro-spherules, or others, hence its range is difficult to be defined. In general, however, a range of from 0.001 to 2 mol/kg, or more particularly from 0.002 to 0.3 mol/kg, with respect to the total weight of the reaction solution containing therein the catalyst, is preferable. If the concentration of halogen ion is below 0.001 mol/kg, there takes place various disadvantages such that hydrolysis of the organic metal compound becomes difficult to proceed satisfactorily, growth of the metal oxide glass spherules is suppressed, and formation of the metal oxide glass film becomes difficult. On the other hand, if the concentration of halogen ion exceeds 2 mol/kg, the metal oxide glass to be produced tends to be non-uniform in its composition, which is also not preferable.

By the way, as to boron which is used during the reaction, if it is to be contained in the designed composition of the metal oxide to be produced, in the form of $B_2O_3$, it may be sufficient that the product contains a calculated amount of the organic boron compound commensurate with the boron content. On the other hand, if boron is to be removed from the formed metal oxide glass film, it can be performed by immersing the glass film in methanol, followed by heating, whereby boron is evaporated from the glass film in the form of methylester.

Hydrolysis reaction of the organic metal compound is usually effected by mixing a principal solution which is mixed and dissolved in a mixed solvent consisting of a predetermined quantity of organic metal compound and a predetermined quantities of water and an organic solvent, with a predetermined quantity of reaction solution containing therein a predetermined quantity of halogen ion, at a predetermined ratio, and sufficiently agitating the mixture to be a uniformly dispersed reaction solution. After this, the pH value of this reaction solution is adjusted to a desired figure with an acid or an alkali, followed by aging the solution for several hours. The boron compound is, in advance, mixed with and dissolved in the principal solution or the reaction solution. In the case of using alkoxyboran, it is advantageous to dissolve it in the principal solution together with other organic metal compound.

The pH value of the reaction solution must be selected depending upon the purpose. That is to say, when the film of metal oxide glass is intended, the pH value is adjusted in a range of from 4.5 to 5 with use of hydrochloric acid, etc., for example, and then subjected to aging. In this case, it may be convenient if a mixture of methyl red and bromocresol green, and others is used as an indicating agent. This mixed indicating agent assumes red color at the acidic side, and green color at the alkaline side, on the march of pH 5.1. The film forming is done by applying the aged reaction solution, as it is, or, if necessary, added with a thickness (e.g., nitro-cellulose), on the surface of the base material, and heating the coating to dry at a temperature of 200° C. or below, thereby vitrifying the same. At the time of heating, the temperature elevation is effected gradually, while carefully watching a temperature region of 50° C. to 70° C. in particular, to thereby complete the preliminary drying step (evaporation of solvent), after which the temperature is further raised. This drying step is particularly important for the sake of forming non-porous film.

In case the production of micro-spherules is intended, the pH value of the reaction solution is adjusted in a range of from 8 to 10, followed by aging the same. As the indicator, in this case, use may be made conveniently of phenolphthalane, etc., for example. In the production of the micro-spherules, there may be adopted a method of dropping the principal solution containing therein boron ions into the reaction solution containing therein halogen ions, which has been prepared in advance, and causing them to react.

During the reaction, it is important to control the concentration of water, acid, or alkali in such a manner that no change in the concentration may take place with respect to the initial value of the reaction as selected in a range of from 0.2 to 50 mol/liter (for water), 0.5 to 10 mol/liter (for acid), and 1.0 to 10 mol/liter (for alkali), respectively.

Since the micro-spherules as produced sink to the bottom of the reaction vessel, they are washed by tilting the vessel, followed by temperature elevation for vitrification as is the case with the above-mentioned film formation.

Further, the method of the present invention is capable of producing both film and spherules in a simple and continuous manner, by adding gradually at a same rate, the principal solution and the reaction solution (inclusive of $B^{3'}$ and halogen ions) of the same composition and concentration, while adjusting the pH value to a predetermined level.

By the way, the concentration of the above-mentioned reaction solution can be varied in a range of ±50% by weight; the concentration of water (including acid or alkali) can be varied in a range of ±30% by weight; and the concentration of halogen ions can be varied in a range of ±30% by weight.

The catalytic actions of the boron ions $B^{3'}$ and the halogen ions $X^-$ in the method of the present invention are yet to be clarified. At the present stage, it may be assumed as follows, in case, for example, metal alkoxide is used as the organic metal compound, and alcohol as the solvent.

$$B^{3'}+4X^-\to BX_4^- \tag{1}$$

$$M(OR)_n+BX_4^-+n/2H_2O\to MX^-_{n+1}+nROH+B^{3'} \tag{2}$$

$$MX^-_{n+1}+nH_2O\to M(OH)_n+(n+1)X^- \tag{3}$$

$$M(OH)_n\to \text{metal oxide glass}+H_2O \tag{4}$$

That is to say, as shown in the equation (1). complex ion $BX_4^-$ to be produced from $B^{3'}$ and $X^-$ exchanges very easily with M in $M(OR)_n$ as in the equation (2), to become complex ion $MX^-_{n+1}$, whereby the hydrolyzation and dehydration/condensation reactions shown in the equations (3) and (4) are accelerated with the consequence that the metal oxide glass is considered to be obtained in a temperature ranging from room temperature to 200° C.

With a view to enabling those persons skilled in the art to put the present invention into practice, the following examples for the actual method of producing the metal oxide glass film and micro-spherules at a normal temperature (room temperature to 200° C.) are presented.

EXAMPLE 1

In the following manner, the principal composition and the catalyst were prepared.

a) Principal composition: zirconium, tetrabutoxide, and $Zr(OBu)_4$ were mixed with a mixture solution consisting of water/methanol/ethanol/isopropanol (hereinafter represented as $H_2O+MeOH+EtOH+i-PrOH$) at a mixing rate of 1:1:1:4, the both components having been mixed at a weight ratio of 5:1 (in terms of solvent). To this mixture, there was further added triethoxy boran $B(OEt)_3$ at a rate of 0.2 mol/kg, followed by agitating the batch for ten minutes to dissolve, thereby preparing the principal composition. Concentration of $Zr(OBu)_4$ with respect to i-PrOH in the principal composition was 70% by weight (or, 20% by weight in terms of $ZrO_2$).

b) Catalyst: as the halogen ion source, use was made of acid ammonium fluoride $NH_4F\cdot HF$ to thereby prepare the catalyst in such a manner that concentration of $F^-$ with respect to the total weight of the same mixture solvent as that for the above-mentioned principal composition might be 0.1 mol/kg.

The principal composition and the catalyst as prepared in the above-mentioned manner were blended at a weight ratio of 3:1, followed by agitating the same for ten minutes. Thereafter, the pH value of the mixture liquid was adjusted to 5.0 with use of hydrochloric acid and ammonia water (as an indicator, use was made of ethanol solution of methyl red and bromo-cresol green), followed by aging the mixture solution for three hours to subject it to hydrolyzation and dehydration-condensation, thereby obtaining a coating agent.

This coating agent had its viscosity of 18 centipoise, which was applied onto a base plate. The base plate with the coating applied thereon was subjected to a preliminary drying step (solvent evaporation step) by gradually elevating a temperature, while paying a particular attention to a temperature region of from 50 to 70° C., after which the temperature was maintained at 120° C. for 30 min. to bake the applied coating to be vitrified. The resulted $ZrO_2$ film had a thickness of 5 to 3 μm.

This coating agent can also be applied by printing. When applying the same by printing, 10% (weight basis) diacetone alcohol solution of nitrocellulose was added to the coating agent at a ratio of from 0.04 to 0.10% by weight with respect to $ZrO_2$ to adjust its viscosity to 150±50 poises for use, because the coating liquid as it is has an extremely low viscosity. The baking condition for the base plate having the coating agent printed thereon was at a temperature of from 180 to 200° C. for 20 min.

The physical properties of the resulted $ZrO_2$ film were as follows:

i) refractive index $N_D^{25}$:1.88 to 1.89 (by Becke's line method using a sodium light source); and ii) film quality: transparent and non-porous.

[Note: a numeral "25" on the upper right hand of $N_D^{25}$ signifies a temperature of 5° C.]

EXAMPLE 2

Formation of $Al_2O_3$ film

Following the procedures in Example 1 above, an $Al_2O_3$ film was formed on the base plate with a thickness of from 5 to 3 μm, with the exception that use was made of aluminum isopropoxide $Al(OP_{n-1})_3$ as an aluminum source, and 10% (by weight) ethanol solution of triethanol amine was added as a masking agent for suppressing production of a hydroxide.

The physical properties of the resulted $Al_2O_3$ film were as follows:

i) refractive index $N_D^{25}$: 1.76 (by Beck's line method using a sodium light source); and ii) film quality: transparent and non-porous.

EXAMPLE 3

Formation of $SiO_2$ film

Following the procedures in Example 1 above, an $SiO_2$ film was formed on the base plate, with the exception that use was made of tetraethoxysilane $Si(OEt)_4$ as a silicon source.

The physical properties of the resulted $SiO_2$ film were as follows:

i) refractive index $N_D^{25}$: 1.36 ii) film quality: transparent and non-porous.

EXAMPLE 4

Formation of $SiO_2/B_2O_3/ZnO$ multi-component glass film (with compositional ratio of 16.7/77.6/5.7 (by wt. %); and 4/16/1 (mol %))

As the starting material, $Si(OEt)_4$, $B(OEt)_3$, and $Zn(OPr)_2$ were blended at the captioned ratio in terms of oxides. The blended was then added to a mixture solvent consisting of $H_2O+EtOH+i-PrOH$ (at 1:1:5) in a manner such that a mixing ratio of the starting material (total quantity of the above-mentioned three ingredients) and the mixture solvent might be 5:1, followed by agitating the mixture for ten minutes to thereby prepare the principal composition. The concentration of metal alkoxide in this mixed solution was 70% by weight with respect to i-PrOH, or 20% by weight in terms of oxide glass.

The catalyst was prepared with use of acid ammonium fluoride $NH_4F.HF$ in such a manner that the concentration of $F^-$ in the mixture solvent of $H_2O+EtOH+i$-PrOH (at a mixing ratio of 1:1:5) might be 0.5 mol/kg.

The thus obtained principal composition and catalyst were mixed at a weight ratio of 3:1. After adjusting the pH value of the mixed solution to 4.5~5.0, it was agitated for ten minutes to be sufficiently mixed together. The batch was further subjected to aging for three hours to obtain a coating agent. This coating agent (having a viscosity of 16 centipoise) was applied on a base plate, and subjected to a preliminary drying step by gradually elevating a heating temperature, while paying a particular attention to a temperature zone of from 50 to 70° C., and further maintained at a temperature range of from 120 to 150° C. for a period of from 20 to 30 min. to complete its vitrification. As the result, there was obtained a multi-component glass film of $SiO_2$—$B_2O_3$—ZnO having a thickness of 3 to 4 $\mu$m.

The physical properties of this multi-component glass film were as follows:

i) refractive index $N_D^{25}$: 1.48 ii) film quality: transparent and non-porous.

Apart from the above-mentioned Example, there was obtained a multi-component glass film by melting each of the above-mentioned component oxides at the same ratio, through high temperature heating. The refractive index $N_D^{25}$ of this glass was 1.485 (specific gravity: 2.01), which was well coincided with the refractive index of the above-mentioned film.

EXAMPLE 5

Formation of $SiO_2/PbO/Al_2O_3$ multi-component glass film (at 10/80/10% by weight)

As the starting material, $Si(OEt)_4$, $Pb(OPr-i)_2$, and $Al(OPr-i)_3$ were blended at the captioned ratio in terms of oxides. The blend was then added to a mixture solvent consisting of $H_2O+MeOH+EtOH+i$-PrOH (at 1:1:1:4) in such a manner that a mixing ratio of the starting material (total quantity of the above-mentioned three ingredients) and the mixture solvent might be 5:1 (i.e., the concentration of the starting material to i-PrOH being 70% by weight, or 20% by weight in terms of oxide glass).

With this mixture solution, the $SiO_2/PbO/Al_2O_3$ multi-component glass film was formed on the base plate.

The physical properties of this multi-component glass film were as follows:

i) refractive index $N_D^{25}$: 1.92 ii) film quality: transparent and non-porous.

Apart from the above-mentioned Example, there was obtained a multi-component glass film by melting at a high temperature the oxide of the same composition as above, which indicated a well coincided refractive index $N_D^{25}$: 1.923.

EXAMPLE 6

Production of micro-spherules of oxide glass

A hydrolyzable organic metal compound (typically, a metal alkoxide) was mixed to dissolve into a single or mixture organic solvent (typically, a mixture solvent of alcohols such as $H_2O+MeOH+EtOH+i$-PrOH (at 1:1:1:4)). Use of alcohols is advantageous, because these can be uniformly mixed with water at a certain definite ratio. The concentration of the organic metal compound with respect to the total quantity of mixture solution should preferably be in a range of from 1 to 50% by weight.

As a concrete example, the principal composition was prepared, in the same manner as in Example 1 above, with use of $Zr(OBu)_4$, the above-mentioned mixture solvent consisting of $H_2O+MeOH+EtOH+i$-PrOH (at 1:1:1:4), and $B(OEt)_3$. Also, the catalyst was prepared, following the procedures of Example 1 above, with use of acid ammonium fluoride $NH_4F.HF$ and the above-mentioned solvent in such a manner that the concentration of $F^-$ in the mixture solvent might be 0.1 mol/kg.

The pH value of this reaction liquid was adjusted in a range of from 5.0 to 4.5, after which the above-mentioned principal composition in the form of solution was dropped into the reaction liquid at a rate of 2.0 g/min. , while adjusting the pH value in a range of from 8 to 10 (using phenolphthalane as the indicator) in the presence of ammonia or a buffer liquid ($NH_4OH+NH_4Cl$). In a couple of minutes after start of the dropping, the reaction system became turbid white. During a period of white-turbidity in the supernatant part, the dropping of the liquid of the principal composition was continued. Upon completion of the dropping in a determined quantity of the principal composition, the reaction was once ceased, and the catalyst was further added to repeat dropping of the principal composition solution, whereby continuous production of the micro-spherules of oxide glass was possible.

The thus produced micro-spherules of oxide glass settled to the bottom of the reaction vessel as sediment, which were separated by tilting the vessel. The thus separated sediment was washed with alcohol and then with water, followed by desiccating the washed deposit. During these operations, variation in the reaction time and particle size of the micro-spherules to be produced could be controlled by maintenance of the pH value at a definite level, and selecting the concentration of the reaction liquid and the alcohols, whereby the micro-spherules of a particle size ranging from 0.1 $\mu$m to 10.0 $\mu$m were obtained. Table 1 below indicates the concentration of $Zr(OBu)_4$ by weight % when the reaction was carried out at 25° C., average particle size ($\mu$m) of the $ZrO_2$ grains, and the coefficient of variation (%) of the particle size.

In the same manner as mentioned above, micro-spherules were manufactured with the metal oxide glass of Examples 1 to 5, as the result of which there were obtained micro-spherules of the metal oxide glass having the same refractive index as that of the glass film.

Further, by a different method, the solutions of the above-mentioned principal composition and catalyst were mixed at a ratio of 3:1, and then agitated and aged. The pH value of the mixture solution was adjusted between 8 and 10, and then it was further agitated to mix, thereby obtaining the micro-spherules of the metal oxide glass from natural sedimentation, which showed the same results as those in the Table below.

According to an examination of a microphotograph, the condition of the micro-spherules of $ZrO_2$ glass manufactured in accordance with the method of the present invention was such that they were perfectly spherical with a uniform particle size of approximately 0.7 $\mu$m.

| Concentration of $Zr(OBu-n)_4$ (wt. %) | 10 | 20 | 30 | 40 |
|---|---|---|---|---|
| Average particle size of $ZrO_2$ as obtained ($\mu$m) | 2.85 | 4.38 | 5.64 | 7.20 |
| Coefficient of variation in | 5 | 5 | 5 | 5 |

| particle size (%) |
|---|

-continued

Since the method for producing the film and the micro-spherules of metal oxide glass according to the present invention is as explained in the foregoing, it is possible to form such glass film and micro-spherules capable of being adapted to various sorts of glass ranging from a single component to a multi-component, in the so-called normal temperature region of from a room temperature to 200° C. The glass film and micro-spherules to be obtained by the method of the present invention have excellent heat-resistance, moisture-resistance, insulating property, gas-barrier property, ion-migration preventive property. Moreover, the metal oxide glass is a physico-chemically stable, transparent, homogeneous, and non-porous material, so that it is expected in a wide range of use such as oxidation prevention of metals, pressurized cooking utensils, coating materials like paper, film, etc., or insulating material for electronic appliances.

Although the present invention has so far been described in detail with reference to preferred embodiments thereof, it is not limited to these embodiments alone, but any changes and modifications may be made by those skilled persons in the art without departing from the spirit and scope of the invention as recited in the appended claims.

What is claimed is:

1. A method for producing metal oxide micro-spherules, which comprises: subjecting a hydrolyzable organic metal compound to hydrolysis in a reaction solution consisting of water, an organic solvent, halogen ions as a catalyst and boron ions, while maintaining pH value of said reaction solution in a range of from 8 to 10, followed by dehydration and condensation to obtain micro-spherules; thereafter rinsing said micro-spherules with water for separation of said micro-spherules from the reaction solution; and maintaining said micro-spherules at a temperature of 200° C. or below.

2. A method for producing metal oxide micro-spherules as set forth in claim 1, wherein said organic metal compound is a metal alkoxide.

3. A method for producing metal oxide micro-spherules as set forth in claim 1, wherein said halogen ions are selected from the group consisting of $F^-$, $Cl^-$, and a mixture of these.

* * * * *

UNITED STATES PATENT AND TRADEMARK OFFICE
CERTIFICATE OF CORRECTION

PATENT NO. : 6,408,648 B1
DATED : June 25, 2002
INVENTOR(S) : Morizane, Toshinori It is certified that error appears in the above-identified patent and that said Letters Patent is hereby corrected as shown below:

<u>Title page,</u>
Item [*] Notice, delete "0" and insert -- 1343 --.

Signed and Sealed this

Thirtieth Day of August, 2005

JON W. DUDAS
*Director of the United States Patent and Trademark Office*